P. E. ANGLE.
MULTIPLE BODY TRUCK.
APPLICATION FILED MAR. 27, 1915.

1,290,694.

Patented Jan. 7, 1919.
3 SHEETS—SHEET 1.

WITNESSES

INVENTOR
Philip E. Angle,
By Fred'k W. Wheeler
Attorney

P. E. ANGLE.
MULTIPLE BODY TRUCK.
APPLICATION FILED MAR. 27, 1915.
1,290,694.
Patented Jan. 7, 1919.
3 SHEETS—SHEET 2.
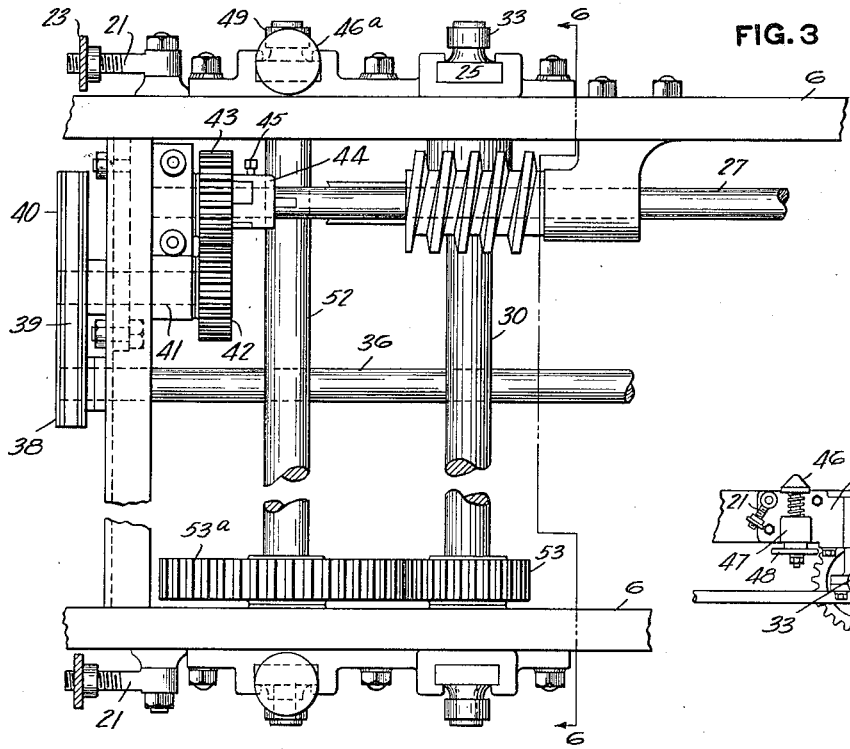
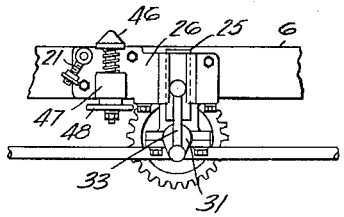
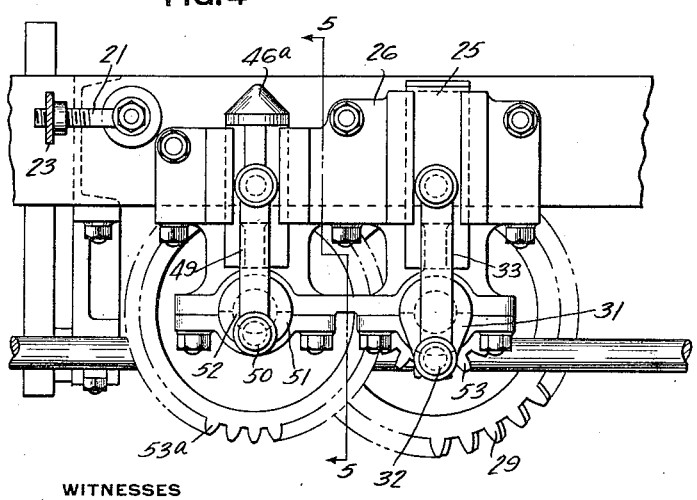
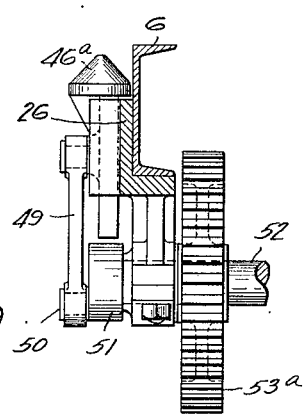
WITNESSES
INVENTOR

P. E. ANGLE.
MULTIPLE BODY TRUCK.
APPLICATION FILED MAR. 27, 1915.

1,290,694.

Patented Jan. 7, 1919.
3 SHEETS—SHEET 3.

WITNESSES

INVENTOR

UNITED STATES PATENT OFFICE.

PHILIP E. ANGLE, OF PITTSBURGH, PENNSYLVANIA.

MULTIPLE-BODY TRUCK.

1,290,694.   Specification of Letters Patent.   Patented Jan. 7, 1919.

Application filed March 27, 1915. Serial No. 17,519.

*To all whom it may concern:*

Be it known that I, PHILIP E. ANGLE, a resident of Pittsburgh, in the county of Allegheny and State of Pennsylvania, have invented a new and useful Improvement in Multiple-Body Trucks, of which the following is a specification.

This invention relates to multiple body trucks. The object of the invention is to provide a truck embodying a chassis and one or more interchangeable bodies, to enable the chassis to be used for transporting one body while the others are being loaded or unloaded. A further object of the invention is to provide a truck in which the demountable body is provided with supporting legs which can be folded out of the way and do not project beyond the normal vehicle lines when the body is in place on the chassis, and which can be opened out to enable the chassis to be run in or out beneath the body. A further object of the invention is to provide improved means for elevating the body to detach it from the chassis and to also center the body in lowering the same upon the chassis. A further object of the invention is to provide a truck of this kind which can be readily operated, which is inexpensive both in first cost and upkeep, in which the body is solidly and rigidly held on the chassis, and which is not liable to get out of order.

Further objects of the invention are in part obvious and in part will appear more in detail hereinafter.

Figure 1:
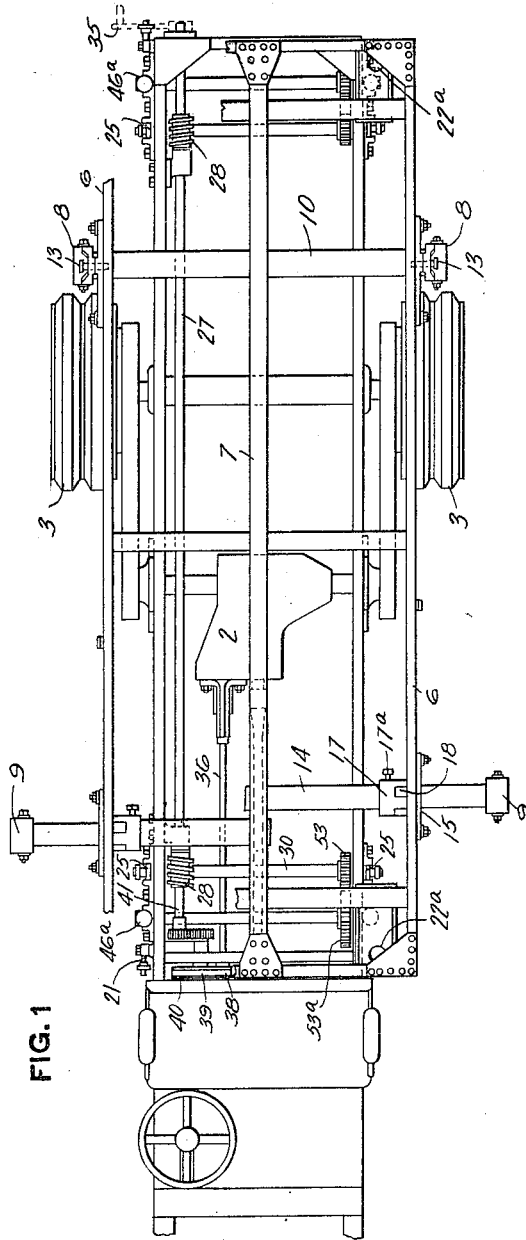
Figure 2:
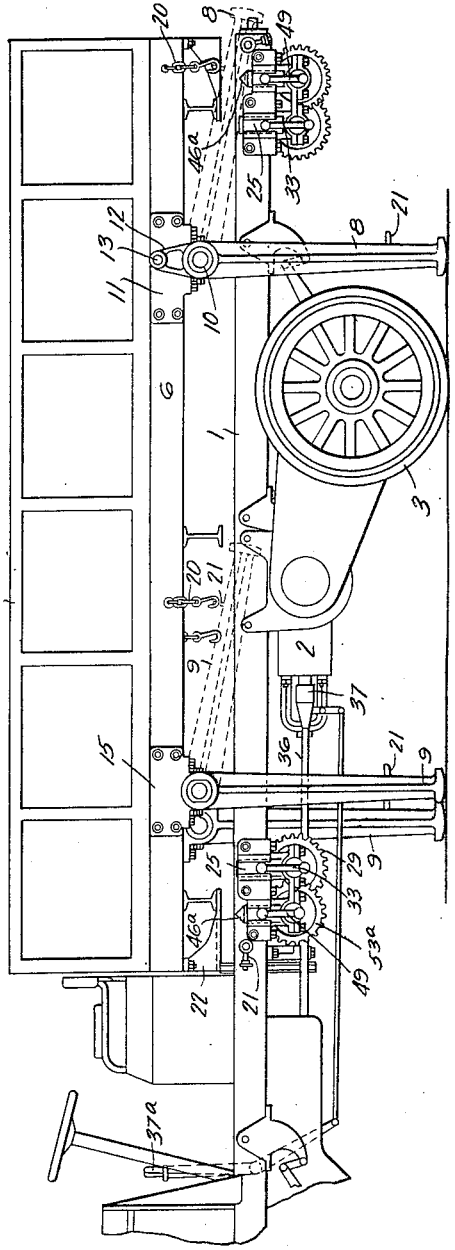
Figure 6:
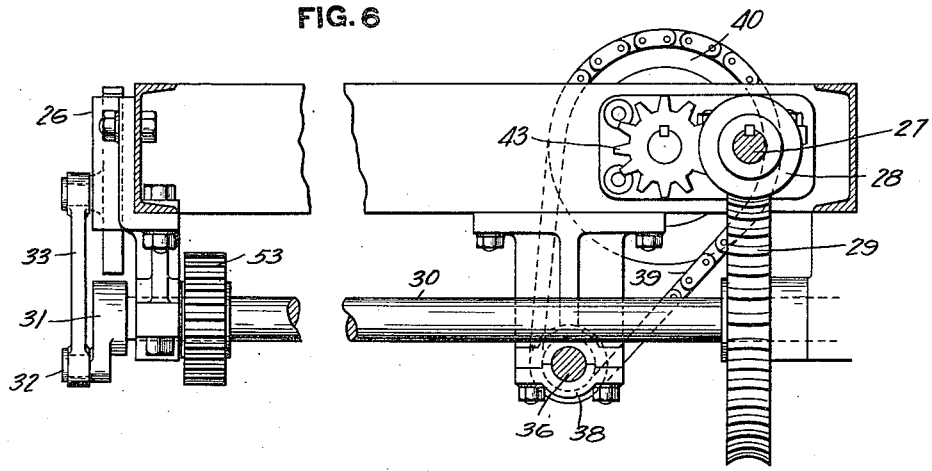
Figure 8:
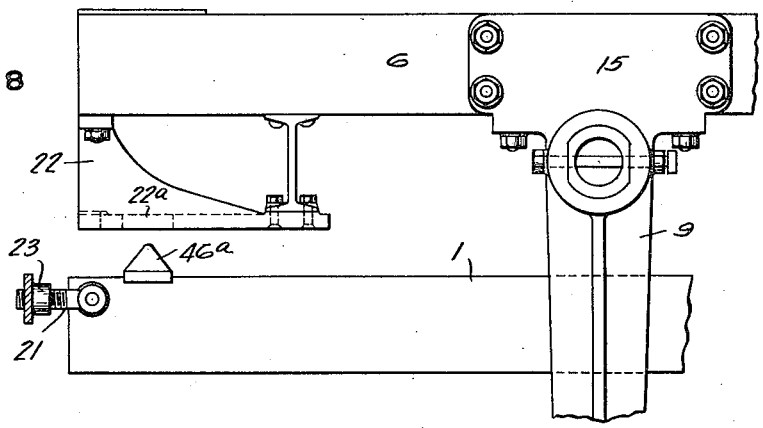
Figure 9:
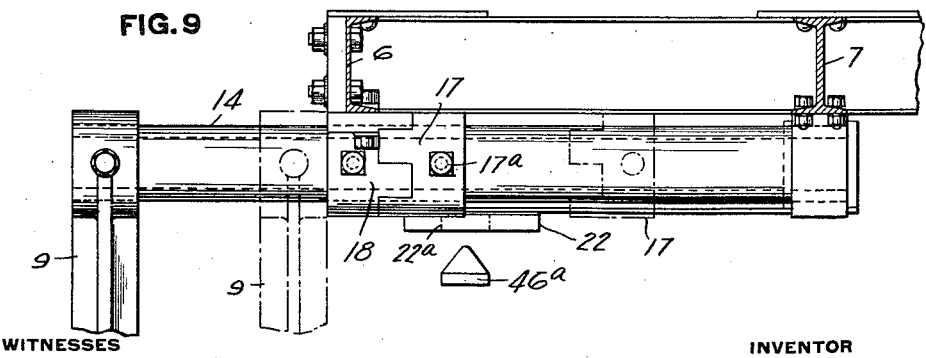

In the drawings, Figure 1 represents a plan view of a truck embodying the invention, the front portion of the chassis and the box of the body being omitted, and parts being broken out to show the operating mechanism; Fig. 2 is a side elevation with the body resting on its legs; Fig. 3 is a plan view, on a larger scale, of a portion of the operating mechanism; Fig. 4 is a side view thereof; Fig. 5 is a cross section on the line 5—5, Fig. 4; Fig. 6 is a cross section on the line 6—6, Fig. 3; Fig. 7 is a detail view of one form of spotting or body locating member; and Figs. 8 and 9 are detail views, on a larger scale, of the front leg supporting devices.

The truck shown in the drawings embodies the usual chassis 1 equipped with a suitable power plant 2 for driving the wheels 3, the rear wheels only being shown. The frame of the chassis is built up of suitable structural steel sections, such as I-beams, channels, or the like, preferably arranged with their upper flanges in a common horizontal plane to form a level unobstructed upper surface for receiving the body.

The body 5 may be of any suitable form, and is shown with a structural steel frame having side sills 6, a center sill 7, and suitable end sills, corner uprights and top members to which are secured panels to form a box or container. Several such bodies may be provided for each chassis, so that one can be transported while another is being filled or emptied. The truck consequently is especially suited for the transportation of goods between freight stations and wholesale houses, between wholesale and retail houses, or for household moving vans, where several hours may be required to load a body and only a few minutes to transport it from its starting point to its destination.

Each body is provided with suitable means for supporting it on the ground when lifted from the chassis, such as the two rear legs 8 and two front legs 9. The rear legs are shown as cast metal members secured to the ends of a tubular cross shaft 10 journaled at a suitable place in the frame, for example, on the rear end thereof above its lower edge, which allows the body to rest directly upon the chassis without forming depressions in its frame members to receive said shaft or interposing spacing members between the chassis and body. As shown, however, the shaft 10 is journaled in brackets 11 secured to the side sills 6 of the body. One or both of said legs is provided with an upwardly extending arm 12 having an adjustable pin or bolt 13 which may be entered into an opening in the bracket 11 to hold said legs in upright position, as shown in full lines, Fig. 2, to prevent the body from toppling over when resting on the ground.

The two front legs 9 may rotate on axes above the lower edge of the body at its front end, but are shown as secured to independent short tubular shafts 14 journaled in brackets 15 carried by the side sills 6 and also in suitable bearings supported on the center sill 7. Each shaft 14 is longer than the distance between the side and center sills, and said shafts are out of line with each other, as shown in Fig. 1, to enable them to be moved transversely of the body. When the body is lifted from the chassis to enable the latter to be detached and used for transporting another body, the shafts 14 are moved outwardly to the position shown in full lines in Fig. 9, the front legs being dropped as shown in Fig. 2. The legs are held from rotation to prevent the body from toppling over by clutch members 17 secured to said shafts and having teeth or projections arranged to engage the teeth of clutch members 18 secured to the side sills 6. In this position of said shafts the legs 9 are beyond the extremities of the rear wheels and axles 3, so that the chassis can be run in or out under the body without interfering with said legs. Preferably, the clutch members 17 are adjustable longitudinally of the shafts 14, being secured thereon by set screws 17ª, to enable the legs 9 to be projected outwardly from the body to any suitable position which may be demanded by floor space and clearance beyond the rear wheels.

When the body is in position on the chassis the front legs are pushed inwardly to the position shown in dotted lines, Fig. 9, in which position the clutch members 17 and 18 are disengaged, and the front and rear legs are then folded up to the positions shown in dotted lines, Fig. 2, and secured in any suitable manner, as by chains 20 provided with hooks for engaging eyes 21 on the legs. In this position all of the legs are within the normal outer lines of the chassis, so that there are no objectionable protuberances at the sides of the truck.

Suitable means is also provided for solidly and firmly securing the body to the chassis when in position thereon. In the form shown each of the side members of the chassis is provided with one or more pivoted bolts 21 adapted to be turned up into slots or openings 22ª in brackets 22 secured to the body, said bolts being provided with threaded heads or nuts 23, which may be screwed down after entering the bolts into said slots for securing the body. The brackets 22 rest upon the side sills of the chassis and form short supporting legs for the body and provide a clearance space between the body and chassis for the shafts 10 and 14.

Preferably, suitable means is provided for elevating the body above the chassis in demounting the same. As shown, the chassis is provided with a plurality, four being shown, of lifting members 25, which are bars sliding in vertical guide ways in brackets 26 secured to the four corners of the chassis. These lifting members are coupled together so that all may be operated simultaneously by the same operating means. The operating mechanism for said members may be of any suitable type, such as a longitudinally extending shaft 27 provided with two worm wheels 28 thereon meshing with worms 29 on two cross shafts 30 located near the front and rear of the chassis. Said transverse shafts at their opposite ends are provided with crank arms 31 having eccentric pins 32 connected to the lifting members 25 by connecting rods 33. The gearing is so arranged that when the shaft 27 is turned in one direction all of the lifting members are elevated to a maximum elevation where the eccentric pins 32 are directly above the shafts 30. This is the highest position of the body. Further rotation of the shaft 27 in the same direction carries the eccentric pins 32 beyond the center and lowers the body. In demounting a body from the chassis the holding bolts 21 are first disengaged therefrom, the shaft 27 is operated to lift the body, the four legs are dropped with the front legs in extended position, and the shaft 27 is then operated to lower the body upon the ground. The chassis is then run out.

Shafts 27 may be operated in any suitable manner, either by hand or by suitable power mechanism. It may be provided with suitable hand-operating mechanism, such as the ratchet lever 35, but preferably is operated by a suitable connection to the power plant 2 of the truck, in which case the ratchet lever 35 serves as an emergency operating member.

In this truck the power plant 2 is connected to a shaft 36 by suitable clutch mechanism 37 connected by links or other members to an operating lever 37ª at the driver's seat, the arrangement being such that by placing the power mechanism in neutral position the clutch 37 can be thrown in to drive the shaft 36 in one direction while the chassis is stationary. Shaft 36 at one end is provided with a small sprocket 38 from which a chain or bolt 39 extends to a large sprocket 40 on a jack shaft 41. The small and large sprockets reduce the speed to a suitable working range for this mechanism. The jack shaft 41 is connected to the longitudinal shaft 27 by intermeshing gears 42 and 43, the latter having clutch teeth arranged to engage a clutch member 44 upon the shaft 27. This clutch member is secured to the shaft in any suitable manner, as by a set screw 45, and normally is always in engagement with the clutch teeth of the gear 43. It is splined to the shaft, however, and may be moved longitudinally of said shaft out of engagement with the gear 43, to enable the shaft 36 to be operated by the hand mechanism in case the power plant gets out of order while mounting or demounting a body.

In lowering the body upon the chassis, it is essential to center it thereon, or, in other words, to have it come down squarely in proper position so that it can be firmly and securely clamped by the holding bolts. Therefore suitable means may also be provided for spotting or locating the body upon the chassis. For example, the chassis may be provided with a plurality of vertically adjustable spotting members 46, shown in Fig. 7 as dowel members having conical heads and threaded shanks working in a threaded boss 47 on the brackets 26 and provided with hand wheels 48 for operating the same. The brackets 22 on the body are also provided with openings 22ª lying directly above the dowel pins 46. In mounting a body upon the chassis the latter is run under the body to as near true position as possible. The hand wheels 48 are then operated to elevate the dowel pins above the upper flat surface of the chassis and the elevating mechanism is operated to slowly lower the body upon the chassis. The conical heads of the dowel members engage the openings 22ª and turn the body to true position on the chassis as it lowers, enabling it to be clamped solidly in proper position thereon.

While the locating or dowel members 46 may be hand-operated, as described, they may also be operated by power mechanism, and preferably by mechanism connected with the body elevating and lowering mechanism, so that the body is located on the chassis and lowered to position by the same operating devices. As shown in Figs. 3 to 6 inclusive, the body locating members, marked 46ª, are slides working in guideways in the brackets 26. They are connected by connecting rods 49 to eccentric crank pins 50 on cranks 51 located at opposite ends of a transverse shaft 52. In the form shown there are four locating members, located at the four corners of the chassis and consequently two transverse shafts 52. Said shafts are connected to the transverse shafts 30 by gears 53 and 53ª, gear 53 having one half the number of teeth in gear 53ª. This arrangement operates as follows:

Let us assume a body resting on its four legs on the ground, as shown in Fig. 2, and that a chassis equipped with power operated lifting members and dowel pins, all in the positions shown in Figs. 3 to 6, is backed under the body. The clamping bolts, posts and dowels are all below the upper level of the chassis frame and consequently do not interfere in any way with the body. Clutch 37 is thrown in and the mechanism is operated until the lifting members 25 reach their highest position, in which the body is lifted slightly from the ground. This requires half a revolution of the gear 53, and as gear 53ª has twice the number of teeth said gear has rotated through one quarter of a revolution and the dowel pins 46ª are half way up, or in other words, have not yet reached the body. The four legs of the body are now folded up, as described, and fastened by their chains 20. Clutch 37 is again thrown in and the eccentric pins 32 move downwardly. At the same time the dowel pins 46ª continue to move upwardly until they meet the descending body, their conical heads entering the openings 22ª in the brackets 22 thereon and thereby twisting or moving the body to center it on the chassis. The movement is continued until the body finally rests directly upon the chassis, when the clutch 37 is thrown out, leaving the dowel pins 46ª engaged in the openings in the body and thereby preventing any lateral movement of the body on the chassis. The clamping bolts are then turned into their recesses and the heads screwed down tight to clamp the body upon the chassis. These bolts need not be heavy bolts, as they only have to prevent up and down movement of the body on the chassis, the dowel pins serving to completely prevent lateral movement thereof.

In demounting the body from the chassis, the clamping bolts are released and the clutch 37 is thrown in, as before, to operate the mechanism in the same direction. The lifting members 25 are in their lowest position and the dowel pins in their upper position. The lifting members rise and engage the body and lift the same from the chassis, enabling the legs to be dropped down to their supporting position. In this position the dowel pins have moved half way down and are partly disengaged from the body. The clutch 37 is again thrown in and the movement continued, which lowers the dowel pins until they are fully disengaged from the body, allowing the latter to come down upon its four legs on the ground. The chassis is then run out.

The truck described is simple and can be operated either manually or automatically. It is particularly suitable for use in transporting goods which require considerable time for loading and only a short time for moving them from place to place. It enables the bodies to be readily mounted upon and demounted from the chassis without special equipment or arrangement of the platforms or other devices at the loading stations. It does away with objectionable protuberances at the side of the truck when the body is in place thereon and complies with all traffic regulations. Nevertheless it enables the chassis to be readily run in and out under the body without interference therewith. Furthermore, the body is located squarely upon the truck in lowering the same thereon so that it can be securely clamped and held. The operating mechanism enables the bodies to be mounted and demounted by power mechanism and both the lifting and locating members are automatically operated in conjunction with each other, so that a skilled operator is unnecessary.

What I claim is:—

1. The combination in a motor driven vehicle, of a chassis, a load carrying body, front and rear supporting legs for the body, independent shafts for the front legs, said shafts being rotatable and also laterally adjustable on the body, means connected to said shafts for preventing rotation thereof, and power operated means to raise the body from the chassis.

2. The combination in a motor driven vehicle, of a chassis, a load carrying body, front and rear supporting legs for the body, independent shafts for the front legs, said shafts being rotatable and also laterally adjustable on the body, means connected to said shafts for preventing rotation thereof, power operated means to raise the body from the chassis, and means to guide the body into proper position on the chassis after it has been raised therefrom.

3. A truck comprising a chassis and a demountable body therefor, supporting legs on the body adapted to lie in either horizontal or vertical position, a motor adapted to drive the truck, means driven by the motor to lift the body on the chassis, and vertically moving body centering means to secure the proper position of the body on the chassis when it is lowered after being lifted therefrom.

4. A motor driven truck embodying a chassis, a removable body therefor, means driven by the motor to raise the body from the chassis, and legs mounted on the body adapted to be turned into vertical position to support the body in raised position and to allow removal of the chassis, and vertically operating centering means adapted to secure the proper seating of the body on the chassis when it is re-seated thereon.

In testimony whereof, I have hereunto set my hand.

PHILIP E. ANGLE.

Witnesses:
  W. R. CLEMENT,
  G. F. POFFENBERGER.